US009442818B1

(12) United States Patent
Doe et al.

(10) Patent No.: US 9,442,818 B1
(45) Date of Patent: Sep. 13, 2016

(54) SYSTEM AND METHOD FOR DYNAMIC DATA COLLECTION

(71) Applicant: Dell Software Inc., Aliso Viejo, CA (US)

(72) Inventors: Douglas Doe, Toronto (CA); Christine Feldmann, Mississauga (CA); Daniel Ivanisevic, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/159,593

(22) Filed: Jan. 21, 2014

(51) Int. Cl.
*G06F 11/34* (2006.01)
*G06F 9/44* (2006.01)

(52) U.S. Cl.
CPC ................................ *G06F 11/3466* (2013.01)

(58) Field of Classification Search
None
See application file for complete search history.

(56) References Cited

U.S. PATENT DOCUMENTS 6,742,178 B1 * 5/2004 Berry .................. G06F 11/3466 714/E11.2
8,307,345 B2 11/2012 Sunkara et al.
8,407,677 B2 3/2013 Pradadarao
8,473,925 B2 6/2013 Gagliardi et al.
8,572,252 B2 10/2013 Ahuja et al.
9,262,301 B2 * 2/2016 Hopley ............... G06F 11/3624
9,274,919 B2 * 3/2016 Greifeneder ........ G06F 9/45504
2007/0214342 A1 * 9/2007 Newburn ............. G06F 11/348 712/216
2008/0295081 A1 * 11/2008 Albot ................. G06F 11/3688 717/128
2010/0115495 A1 * 5/2010 Sunkara ............. G06F 11/3466 717/130
2010/0131928 A1 * 5/2010 Parthasarathy ..... G06F 11/3664 717/126
2013/0179479 A1 * 7/2013 Chakra ............ G06F 17/30115 707/822
2013/0246769 A1 9/2013 Farrell et al.
2014/0331092 A1 * 11/2014 Taylor ................ G06F 11/0787 714/48

* cited by examiner

*Primary Examiner* — Daxin Wu
(74) *Attorney, Agent, or Firm* — Winstead PC

(57) ABSTRACT

In one embodiment, a method is performed on a computer system comprising computer hardware. The method includes inserting, at an instrumentation point of a target program, an event generator comprising an instrumentation identifier. The method further includes registering the instrumentation identifier in instrumentation records. The instrumentation records link the instrumentation identifier to a dynamically variable event handler. In addition, the method includes, responsive to an event generated by the event generator, receiving a callback comprising the instrumentation identifier. Further, the method includes, using the instrumentation identifier, identifying in the instrumentation records the dynamically variable event handler. Additionally, the method includes invoking the dynamically variable event handler. Also, the method includes collecting data related to execution of the target program using the invoked dynamically variable event handler.

21 Claims, 4 Drawing Sheets

120a

| CLASS NAME | METHOD NAME | CLASS COOKIE | METHOD COOKIE | HANDLER |
|---|---|---|---|---|
| CLASS 1 NAME | METHOD 1 NAME | CLASS 1 COOKIE | METHOD 1 COOKIE | HANDLER n |
| .. | METHOD 2 NAME | .. | METHOD 2 COOKIE | .. |
| CLASS 2 NAME | | CLASS 2 COOKIE | | HANDLER 1 |
| | METHOD 1 NAME | | METHOD 1 COOKIE | |

FIG. 2

SYSTEM AND METHOD FOR DYNAMIC DATA COLLECTION

BACKGROUND

1. Technical Field

The present invention relates generally to data collection and more particularly, but not by way of limitation, to systems and methods for instrumenting computer programs.

2. History of Related Art

Software applications are often instrumented in order to glean information about their execution. When it is desired to change an aspect of monitoring the software application during execution, the software application usually must be reinstrumented. Reinstrumentation, however, carries computational overhead. In addition, depending on an instrumentation environment, other performance delays can result. For example, with respect to JAVA implementations, some versions of Java Virtual Machine require that an application server be stopped and restarted.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed on a computer system comprising computer hardware. The method includes inserting, at an instrumentation point of a target program, an event generator comprising an instrumentation identifier. The method further includes registering the instrumentation identifier in instrumentation records. The instrumentation records link the instrumentation identifier to a dynamically variable event handler. In addition, the method includes, responsive to an event generated by the event generator, receiving a callback comprising the instrumentation identifier. Further, the method includes, using the instrumentation identifier, identifying in the instrumentation records the dynamically variable event handler. Additionally, the method includes invoking the dynamically variable event handler. Also, the method includes collecting data related to execution of the target program using the invoked dynamically variable event handler.

In one embodiment, an information handling system includes a processing unit, wherein the processing unit is operable to implement a method. The method includes inserting, at an instrumentation point of a target program, an event generator comprising an instrumentation identifier. The method further includes registering the instrumentation identifier in instrumentation records. The instrumentation records link the instrumentation identifier to a dynamically variable event handler. In addition, the method includes, responsive to an event generated by the event generator, receiving a callback comprising the instrumentation identifier. Further, the method includes, using the instrumentation identifier, identifying in the instrumentation records the dynamically variable event handler. Additionally, the method includes invoking the dynamically variable event handler. Also, the method includes collecting data related to execution of the target program using the invoked dynamically variable event handler.

In one embodiment, a computer-program product includes a non-transitory computer-usable medium having computer-readable program code embodied therein. The computer-readable program code is adapted to be executed to implement a method. The method includes inserting, at an instrumentation point of a target program, an event generator comprising an instrumentation identifier. The method further includes registering the instrumentation identifier in instrumentation records. The instrumentation records link the instrumentation identifier to a dynamically variable event handler. In addition, the method includes, responsive to an event generated by the event generator, receiving a callback comprising the instrumentation identifier. Further, the method includes, using the instrumentation identifier, identifying in the instrumentation records the dynamically variable event handler. Additionally, the method includes invoking the dynamically variable event handler. Also, the method includes collecting data related to execution of the target program using the invoked dynamically variable event handler.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 illustrates an example of instrumentation records;

DETAILED DESCRIPTION OF ILLUSTRATIVE EMBODIMENTS OF THE INVENTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Further, as used herein, the term routine, in addition to having its ordinary meaning, can include any portion of code, including a procedure, a subroutine, a subprogram, a function, a method, a class, a predicate, or the like.

Figure 1:
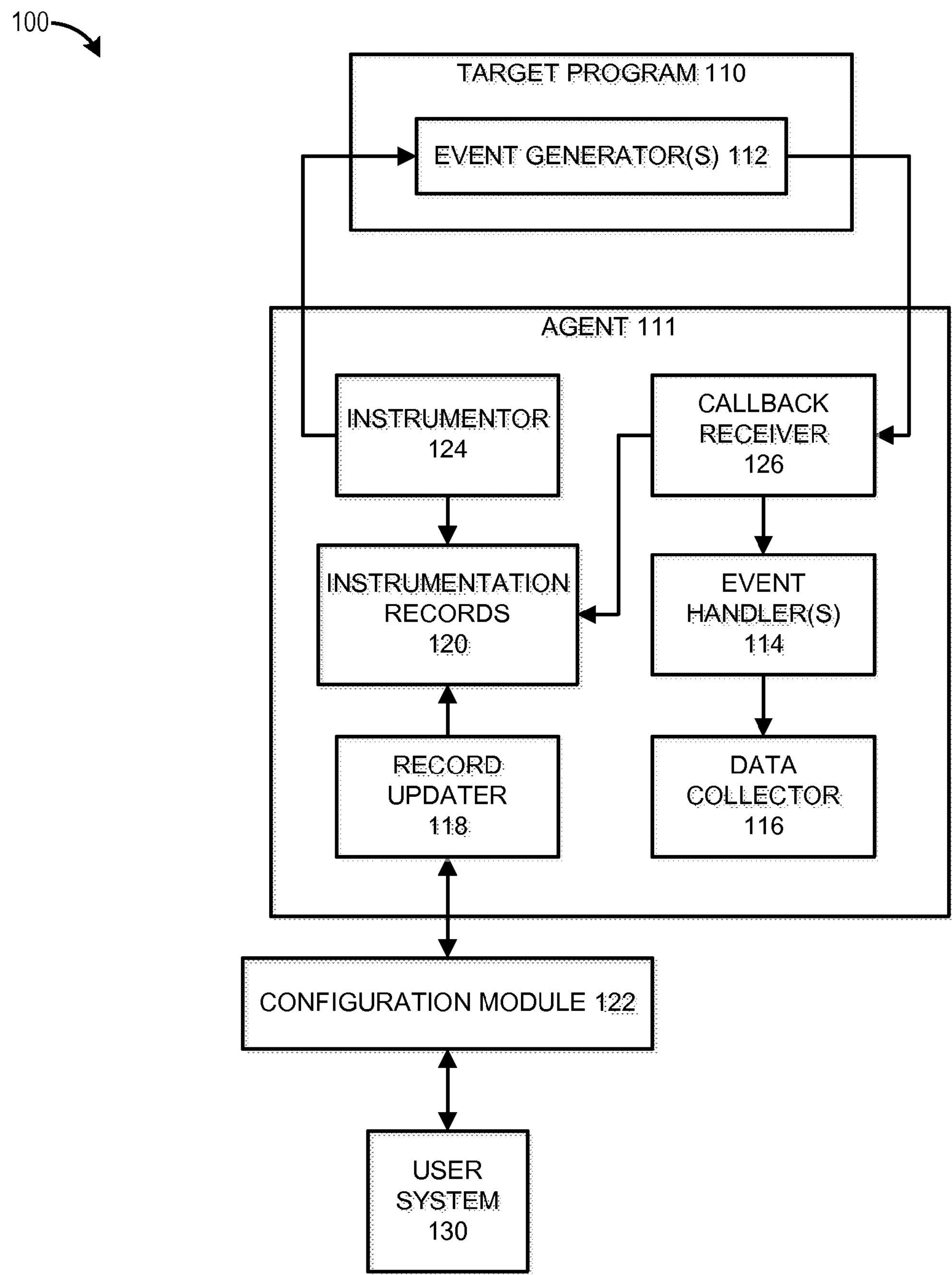
FIG. 1 illustrates an embodiment of an instrumentation environment.

FIG. 1 illustrates an embodiment of an instrumentation environment 100 for instrumenting a target program 110. The instrumentation environment 100 includes an agent 111 and a configuration module 122. The agent 111 can instrument the target program 110 for performance profiling or for other analysis. Advantageously, in certain embodiments, the agent 111 and the configuration module 122 can dynamically change what data is collected via instrumentation.

The agent 111 and the configuration module 122 can be implemented in one or more information handling systems, such as physical computer systems. Likewise, the target program 110 can be implemented in one or more information handling systems. In addition, the target program 110 and the agent 111 can be implemented in separate information handling systems, including machines distributed over a network, such as a LAN, WAN, the Internet, or the like.

In certain embodiments, the agent 111 can be used for profiling or monitoring the target program 110. This profiling can include memory analysis, performance analysis, and/or coverage analysis of the target program 110, among other features. Memory analysis can include identifying and resolving memory leaks and object cycling to increase program efficiency and stability. Performance analysis can include identifying and resolving bottlenecks and thread deadlocks to increase program performance and scalability. Coverage analysis can include identifying unexecuted lines of code during unit testing to increase test coverage and program correctness. In certain embodiments, the agent 111 can be used to profile programs written in a variety of languages, such as JAVA, C++, any language implemented on the .NET framework, and other interpreted and/or managed languages, among others. Also, as described above, the agent 111 can be used for analysis other than profiling.

The configuration module 122 can include hardware and/or software for providing a user interface that provides functionality for controlling operation of the instrumentation environment 100. The configuration module 122 can provide the user interface to a user system 130, which can be a computer system under operation of a user. In one embodiment, the agent 111 and/or the target program 110 are installed on the user system 130. Through the user interface, the user can select what types of information to gather from the target program 110 and what granularity of information to obtain.

In the depicted embodiment, the agent 111 includes one or more event handlers 114, a data collector 116, a record updater 118, instrumentation records 120, an instrumentor 124, and a callback receiver 126. The instrumentor 124 can include hardware and/or software for instrumenting the target program 110 with one or more event generators 112. The instrumentor 124 can insert one or more event generators 112 in the target program's 110 source code, interpreted code, managed code, compiled code, or the like. If the target program 110 is written in JAVA, for example, the instrumentor 124 can embed the event generators 112 in JAVA bytecode of the target program 110. In one embodiment, one event generator 112 is inserted into several routines of the target program 110. However, several event generators 112 can also be inserted into a single routine of the target program 110. For example, a single routine might be instrumented with a memory analysis event generator, a performance analysis event generator, and/or a coverage analysis event generator.

In a typical embodiment, the instrumentor 124 instruments the target program 110 using an instrumentation identifier. In various embodiments, the instrumentation can occur before execution of the target program 110, during execution of the target program 110, etc. Consider, for example, an embodiment in which the target program 110 is written in JAVA. If it is desired that the instrumentation occur before execution of the target program 110, the instrumentor 124 could instrument each method of each class and save the classes to storage for later retrieval by Java Virtual Machine (JVM). However, if it is desired that instrumentation occur during execution of the target program 110, the instrumentor 124 could instead instrument such methods as the classes are loaded by JVM (i.e., before those methods are executed).

The instrumentation identifier typically serves to uniquely identify an instrumentation performed by the instrumentor 124. For instance, continuing the JAVA example described above, each instrumentation might be identified by which class and method are instrumented. In such a case, the instrumentation identifier for each instrumentation could include a unique identifier for the instrumented class and a unique identifier for the instrumented method. In various embodiments, such class and method identifiers can be contained, for example, within cookies of a desired format.

The instrumentation records 120 can include a record of each instrumentation carried out by the instrumentor 124. As described in greater detail below, each record can dynamically link a given instrumentation to a particular event handler of the one or more event handlers 114. For example, in some cases, each record could include the instrumentation identifier, a name of an instrumented class, a name of an instrumented method of that class, a reference to an event handler of the event handlers 114 that is linked to that instrumentation identifier, and/or the like.

Advantageously, in certain embodiments, the instrumentation records 120 can enable dynamic modifications to data collection without reinstrumentation. In an embodiment, the one or more event generators 112 can be routines, instructions, or the like that make calls which cause the one or more event handlers 114 of the agent 111 to be invoked. As described in greater detail below, dynamic changes to information gathered via the instrumentation can occur without reinstrumentation using the instrumentation records 120.

In particular, as events are generated and/or occur, a particular event generator of the one or more event generators 112 makes a call that includes, for example, the instrumentation identifier. The particular event generator can make the call in response to some action occurring, such as entry of a routine of the target program 110. In a typical embodiment, the callback receiver 126 receives the call, looks up the instrumentation identifier in the instrumentation records 120, and identifies which event handler of the one or more event handlers 114 is currently linked to the particular event generator. The linked event handler of the one or more event handlers 114 can be invoked so that desired data can be provided to the data collector 116.

In certain embodiments, the callback receiver 126 can be representative of functionality that is performed by the one or more event generators 112. In these embodiments, the one or more event generators 112 can perform the look-up in the instrumentation records 120 and directly invoke the linked event handler via the reference contained in a corresponding record. In other embodiments, the callback receiver 126 can be representative of functionality performed by the agent 111 as illustrated.

Advantageously, in certain embodiments, the event handlers 114 that are linked to a given event generator 112 can be dynamically variable without reinstrumenting the target program 110. In a typical embodiment, the instrumentor 124 can register each instrumentation in the instrumentation records 120 when the instrumentation occurs. The registration can include inserting into the instrumentation records 120 a record that includes, for example, the instrumentation identifier and a reference to a particular event handler of the one or more event handlers 114. In some cases, the particular event handler may be responsive to user input. In other cases, the particular event handler may be a default selection, for example, by the instrumentor 124. As applicable, the inserted record can include a name of the instrumented class, a name of the instrumented method, and/or the like.

When a change to data collected by the data collector 116 is desired by the user, the configuration module 122 can receive a data-collection change from the user system 130. For example, the data-collection change may change a type of information to gather, a granularity of information to obtain, etc. In a typical embodiment, the data-collection change is implemented by dynamically modifying which event handler of the one or more event handlers 114 is linked in the instrumentation records 120 to a particular instrumentation identifier. In some embodiments, the configuration module 122 can provide one or more data-collection options to the user system 130 for selection and, based on the selection, choose which event handler of the one or more event handlers 114 is appropriate. In some cases, the configuration module 122 can allow a user of the user system 130 to directly select which event handler of the one or more event handlers 114 is appropriate. In a typical embodiment, the record updater 118 records any changes in the instrumentation records 120.

In certain embodiments, all dynamic changes to the instrumentation records 120 take effect immediately without any need to reinstrument the target program 110. Rather, the one or more event generators 112 operate as described above using the instrumentation identifier. As events are generated and/or occur with respect to a particular event generator of the one or more event generators 112, the callback receiver 126 receives a call, looks up which of the event handlers 114 is linked to an instrumentation identifier at a given time, and proceeds as described above. In many cases, this can save significant time. For example, in JAVA implementations, the fact that no reinstrumentation needs to occur typically means that there is also no need for JVM to reload any previously instrumented classes. Since many versions of JVM require that a program such as the target program 110 restart in order to reload classes, the elimination of any need to reload classes can save substantial additional time.

FIG. 2 illustrates an example of instrumentation records 120*a*. In certain embodiments, the instrumentation records 120 of FIG. 1 can have a table format as shown with respect to the instrumentation records 120*a*. For illustrative purposes, the instrumentation records 120*a* depicts a table row for each instrumentation performed by the instrumentor 124. As shown, in an implementation in which each method of each class of the target program 110 is instrumented, each entry in the instrumentation records 120*a* can include a class name, a method name, a class cookie that includes a unique identifier for an instrumented class, a method cookie that includes a unique identifier for an instrumented method of that class, and a reference to a particular event handler of the one or more event handlers 114 that is currently linked to that entry.

Figure 3:
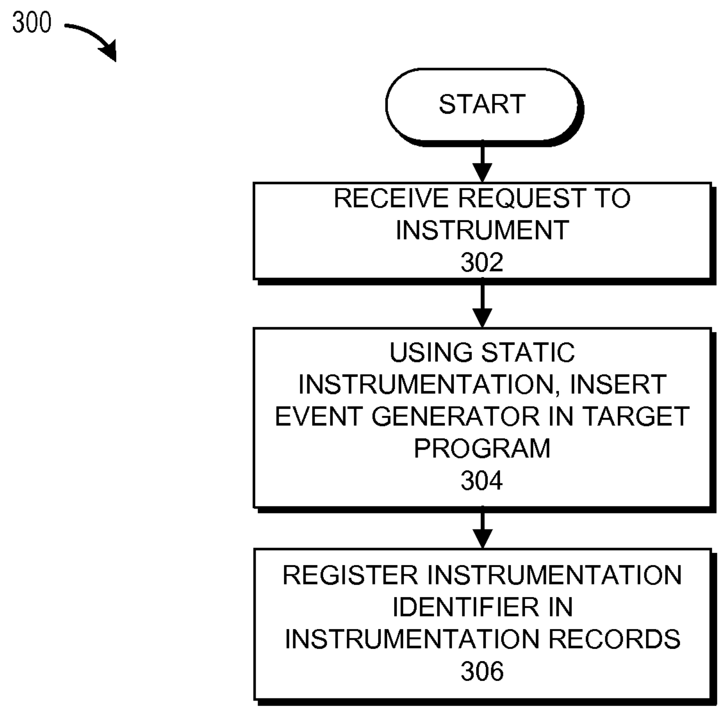
FIG. 3 illustrates an example of a process for instrumenting a target program.

FIG. 3 illustrates an example of a process 300 for instrumenting a target program. The process 300 can be implemented by any system that can access one or more data sources. For example, the process 300, in whole or in part, can be implemented by one or more of the agent 111, the configuration module 122, and/or the user system 130. The process 300 can also be performed generally by the instrumentation environment 100. Although any number of systems, in whole or in part, can implement the process 300, to simplify discussion, the process 300 will be described in relation to specific components of the instrumentation environment 100.

At block 302, the agent 111 receives a request to instrument the target program 110. In various embodiments, the request can identify an instrumentation point such as, for example, a location within a particular method of a class. In some cases, the request can originate, at least in part, from the user of the user system 130. At block 304, the instrumentor 124 inserts at least one of the event generators 112 in the target program 110 in accordance with the request. At block 306, the instrumentor 124 registers in the instrumentation records 120 an instrumentation identifier for the instrumentation. For example, in some embodiments, the instrumentation identifier can include an identifier for an instrumented class and an identifier for an instrumented method. In some embodiments, the instrumentor 124 can encapsulate such identifiers in a cookie of a desired format.

Figure 4:
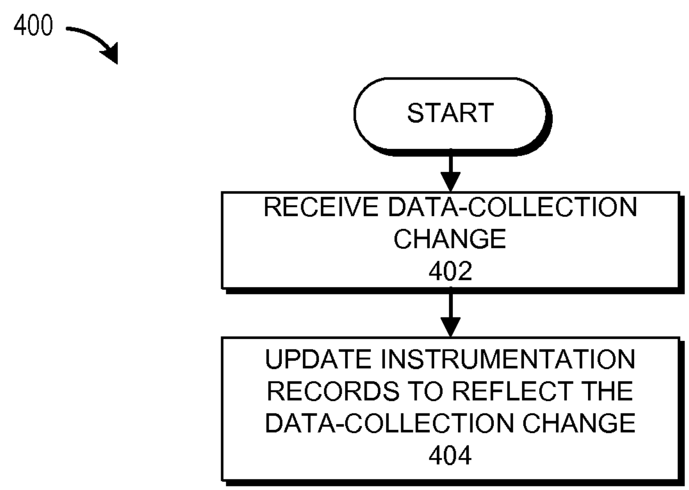
FIG. 4 illustrates an example of a process for dynamically changing which event handler is linked to an instrumentation.

FIG. 4 illustrates an example of a process for dynamically changing, during execution of a target program, which event handler is linked to an instrumentation. In some embodiments, the process 400 can be performed after an iteration of the process 300 of FIG. 3. The process 400 can be implemented by any system that can access one or more data sources. For example, the process 400, in whole or in part, can be implemented by one or more of the agent 111, the configuration module 122, and/or the user system 130. The process 400 can also be performed generally by the instrumentation environment 100. Although any number of systems, in whole or in part, can implement the process 400, to simplify discussion, the process 400 will be described in relation to specific components of the instrumentation environment 100.

At block 402, the configuration module 122 receives a data-collection change. In a typical embodiment, the data-collection change represents a dynamic modification to an event handler of the event handlers 114 to which a particular instrumentation identifier is linked. In general, the data-collection change specifies the particular instrumentation identifier and a different event handler of the event handlers 114. In some embodiments, the data-collection change results, at least in part, from interaction with the user of the user system 130 as described with respect to FIG. 1. In some cases, the data-collection change can be automatically generated, for example, responsive to a detected performance event. At block 404, the record updater 118 updates the instrumentation records 120 to link the particular instrumentation identifier to the different event handler. For example, the block 404 can include revising a corresponding record in the instrumentation records 120 to include a reference to the different event handler.

Figure 5:
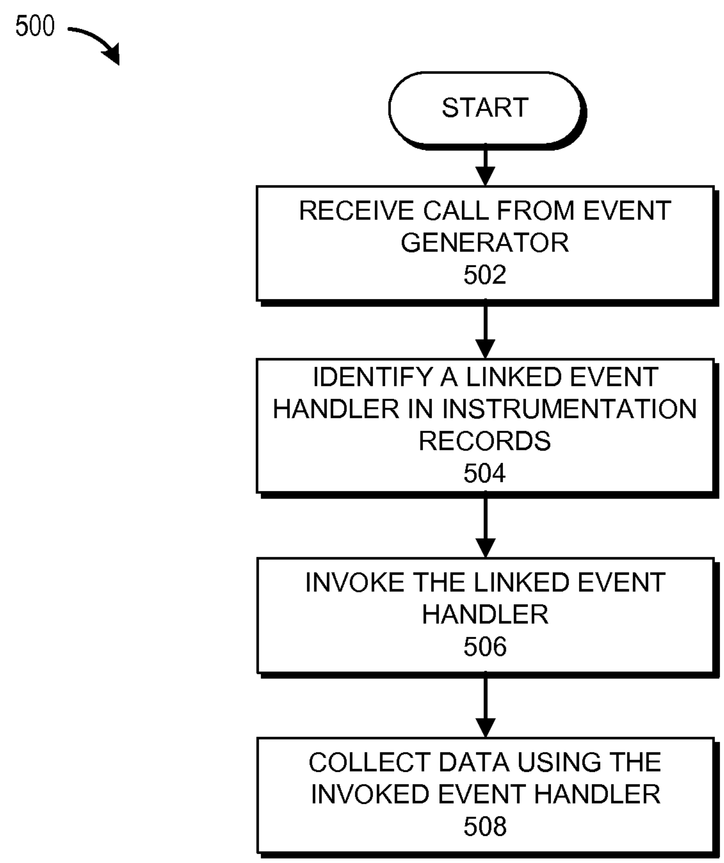
FIG. 5 illustrates an example of a process for performing data collection.

FIG. 5 illustrates an example of a process for performing data collection. In various embodiments, the process 500 can be performed after one or more iterations of the process 300 of FIG. 3 and/or the process 400 of FIG. 4. The process 500 can be implemented by any system that can access one or more data sources. For example, the process 500, in whole or in part, can be implemented by one or more of the agent 111, the configuration module 122, and/or the user system 130. The process 500 can also be performed generally by the instrumentation environment 100. Although any number of systems, in whole or in part, can implement the process 500, to simplify discussion, the process 500 will be described in relation to specific components of the instrumentation environment 100.

At block 502, the callback receiver 126 receives a call from an event generator. In a typical embodiment, the call includes an instrumentation identifier. At block 504, the callback receiver 126 identifies which event handler of the event handlers 114 is currently linked in the instrumentation records 120 to the instrumentation identifier. At block 506, the callback receiver 126 invokes the linked event handler. At block 508, the data collector 116 collects data related to the execution of the target program 110 from the invoked event handler. For example, the block 508 can encompass the linked event handler providing the data to the data collector 116.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a computer system comprising computer hardware:
- inserting into a target program, at an instrumentation point of the target program, an event generator comprising an instrumentation identifier;
- registering the instrumentation identifier in instrumentation records, wherein the instrumentation records link the instrumentation identifier to a dynamically variable event handler;
- responsive to an event generated by the event generator, receiving a callback comprising the instrumentation identifier;
- using the instrumentation identifier, identifying in the instrumentation records the dynamically variable event handler;
- invoking the dynamically variable event handler; and
- collecting data related to execution of the target program using the invoked dynamically variable event handler.

2. The method of claim 1, comprising, during execution of the target program, dynamically modifying the instrumentation records so that the instrumentation identifier is linked to a different event handler.

3. The method of claim 2, wherein the dynamic modification is responsive to user input.

4. The method of claim 2, wherein the dynamically modifying is performed prior to the receiving of the callback and without reinstrumenting the target program.

5. The method of claim 1, wherein the instrumentation records comprise a table.

6. The method of claim 1, wherein the inserting can be triggered by a user.

7. The method of claim 1, comprising performing the method for selected methods of selected classes of the target program.

8. An information handling system comprising:
- a processor comprising computer hardware, wherein the processor is operable to implement a method comprising:
  - inserting into a target program, at an instrumentation point of the target program, an event generator comprising an instrumentation identifier;
  - registering the instrumentation identifier in instrumentation records, wherein the instrumentation records link the instrumentation identifier to a dynamically variable event handler;
  - responsive to an event generated by the event generator, receiving a callback comprising the instrumentation identifier;
  - using the instrumentation identifier, identifying in the instrumentation records the dynamically variable event handler;
  - invoking the dynamically variable event handler; and
  - collecting data related to execution of the target program using the invoked dynamically variable event handler.

9. The information handling system of claim 8, the method comprising, during execution of the target program, dynamically modifying the instrumentation records so that the instrumentation identifier is linked to a different event handler.

10. The information handling system of claim 9, wherein the dynamic modification is responsive to user input.

11. The information handling system of claim 9, wherein the dynamically modifying is performed prior to the receiving of the callback and without reinstrumenting the target program.

12. The information handling system of claim 8, wherein the instrumentation records comprise a table.

13. The information handling system of claim 8, wherein the inserting can be triggered by a user.

14. The information handling system of claim 8, comprising performing the method for selected methods of selected classes of the target program.

15. A computer-program product comprising a non-transitory computer-usable medium having computer-readable program code embodied therein, the computer-readable program code adapted to be executed to implement a method comprising:
- inserting into a target program, at an instrumentation point of the target program, an event generator comprising an instrumentation identifier;
- registering the instrumentation identifier in instrumentation records, wherein the instrumentation records link the instrumentation identifier to a dynamically variable event handler;
- responsive to an event generated by the event generator, receiving a callback comprising the instrumentation identifier;
- using the instrumentation identifier, identifying in the instrumentation records the dynamically variable event handler;
- invoking the dynamically variable event handler; and
- collecting data related to execution of the target program using the invoked dynamically variable event handler.

16. The computer-program product of claim 15, the method comprising, during execution of the target program, dynamically modifying the instrumentation records so that the instrumentation identifier is linked to a different event handler.

17. The computer-program product of claim 16, wherein the dynamic modification is responsive to user input.

18. The computer-program product of claim 16, wherein the dynamically modifying is performed prior to the receiving of the callback and without reinstrumenting the target program.

19. The computer-program product of claim 15, wherein the instrumentation records comprise a table.

20. The computer-program product of claim 15, wherein the inserting can be triggered by a user.

21. The computer-program product of claim 15, comprising performing the method for selected methods of selected classes of the target program.

* * * * *